United States Patent
Bujak et al.

(10) Patent No.: US 8,255,118 B2
(45) Date of Patent: Aug. 28, 2012

(54) VEHICLE CONTROL SYSTEM WITH ADVANCED TIRE MONITORING

(75) Inventors: Christopher R. Bujak, New Baltimore, MI (US); Manoharprasad K. Rao, Novi, MI (US); Mark A. Cuddihy, New Boston, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 13/215,042

(22) Filed: Aug. 22, 2011

(65) Prior Publication Data

US 2011/0301821 A1 Dec. 8, 2011

Related U.S. Application Data

(62) Division of application No. 11/693,175, filed on Mar. 29, 2007, now Pat. No. 8,032,281.

(51) Int. Cl.
*G01M 17/02* (2006.01)

(52) U.S. Cl. .......................................... 701/37; 303/152

(58) Field of Classification Search .................... 701/37, 701/29, 80, 70, 79, 83, 84; 303/152, 112, 303/155; 188/126; 475/195; 477/92, 94, 477/182
See application file for complete search history.

(56) References Cited

U.S. PATENT DOCUMENTS

| | | | |
|---|---|---|---|
| 6,278,361 B1 | 8/2001 | Magiawala et al. | |
| 6,397,127 B1 | 5/2002 | Meyers et al. | |
| 6,424,907 B1 | 7/2002 | Rieth et al. | |
| 6,882,923 B2 | 4/2005 | Miller et al. | |
| 6,941,213 B2 | 9/2005 | Yasui et al. | |
| 6,962,075 B2 * | 11/2005 | Bertrand | 73/146 |
| 7,020,552 B2 | 3/2006 | Park | |
| 7,203,579 B2 * | 4/2007 | Yokota et al. | 701/29.2 |
| 7,286,909 B2 * | 10/2007 | Darke | 701/3 |
| 2004/0064246 A1 | 4/2004 | Lu et al. | |
| 2005/0033459 A1 | 2/2005 | Otsuki et al. | |
| 2005/0033486 A1 | 2/2005 | Schmitt et al. | |
| 2005/0033549 A1 | 2/2005 | Clark | |
| 2005/0038589 A1 | 2/2005 | Shukla | |
| 2005/0085987 A1 | 4/2005 | Yokota et al. | |
| 2005/0090938 A1 | 4/2005 | Ranelli | |
| 2005/0154509 A1 | 7/2005 | Schuberts et al. | |
| 2006/0027412 A1 | 2/2006 | Geborek | |
| 2006/0041336 A1 | 2/2006 | Schubert et al. | |
| 2006/0064218 A1 | 3/2006 | Subbian et al. | |
| 2006/0136111 A1 | 6/2006 | Robert et al. | |

FOREIGN PATENT DOCUMENTS

WO  WO 2005095133 A1  10/2005

* cited by examiner

*Primary Examiner* — Dalena Tran
(74) *Attorney, Agent, or Firm* — Angela M. Brunetti; Fredrick Owens

(57) ABSTRACT

A control system (11) for a vehicle (10) includes vehicle dynamics sensors (35-47) providing a vehicle dynamics signal. Tire monitoring system sensors (20) in each wheel generate tire signals including temperature, pressure and acceleration data. A controller (26) communicates with the tire monitoring system sensors (20) and at least one vehicle dynamics sensor, and generates a brake signal as a function of the multi-axis acceleration data of the tire signals. The brake signal is transmitted to a brake system (64) to apply a brake torque in response to the brake signal.

4 Claims, 8 Drawing Sheets

VEHICLE CONTROL SYSTEM WITH ADVANCED TIRE MONITORING

CROSS REFERENCE

This application is a divisional of U.S. patent application Ser. No. 11/693,175 filed on Mar. 29, 2007, now U.S. Pat. No. 8,032,281, titled Vehicle Control System With Advanced Tire Monitoring, herein incorporated by reference.

TECHNICAL FIELD

The present invention relates generally to vehicle control systems and tire monitoring systems. More particularly, the present invention is related to vehicle control systems incorporating advanced tire monitoring for comfort and convenience.

BACKGROUND

Tire pressure monitoring may soon become a standard feature on vehicles. Current tire pressure monitoring sensors, however, have limited functionality, and are not capable of discerning coordinate acceleration data for a wheel. Conventional tire pressure sensors provide pressure and temperature sensing along with data processing and wireless communication of such data. Most also include a movement detection device such as switch or piezoelectric device that activates upon a radial acceleration. The movement detection devices "wake" the sensor to initiate data transmission, while saving battery life while the wheel is not moving.

Advanced tire monitoring sensors (ATMS) are currently being developed. Besides traditional pressure and temperature data, ATMS include coordinate acceleration data for the associated wheel. This is accomplished with micro-electro-mechanical system (MEMS) accelerometers. Such devices have advantages in terms of robustness, and the ability to provide a linear output response to acceleration. Multiple MEMS are also contemplated to provide multi-axis (coordinate) acceleration data for the associated wheel.

ATMS provide the potential to vehicle manufacturers to offer new or enhanced capabilities in vehicle systems. The present disclosure is directed toward providing improved vehicle comfort and convenience systems utilizing ATMS.

SUMMARY OF THE INVENTION

One embodiment of the present invention provides a system for a vehicle including a tire sensor located within each wheel of the vehicle and generating a tire signal comprising pressure, temperature and multi-axis acceleration data. The system also includes at least one vehicle dynamics sensor providing a vehicle dynamics signal, such as the vehicle speed and braking. Further, a controller communicates with the tire sensor and the at least one vehicle dynamics sensor. The controller, in response to the vehicle dynamics signal, generates a roadway surface condition estimation value as a function of the multi-axis acceleration data of the tire signal, and transmits the roadway surface condition estimation value to at least one vehicle system controller. The system controller can be a suspension control system.

The controller generates the roadway surface condition estimation value as a function of the tire signal by comparing frequency and amplitude response characteristics of the tire signal to stored frequency and amplitude response characteristics indicative of different roadway surfaces. An indicator can signal to the vehicle operator the roadway surface condition estimation value.

The suspension control system can include any one of an active suspension component for altering suspension geometry, a pneumatic cylinder adapted to adjust vehicle ride height, an adjustable suspension damper, or a central tire inflator adapted to adjust tire inflation. Thus, when the roadway surface condition estimation value indicates a rough surface, the suspension control system is adapted to soften the vehicle suspension characteristics. Conversely, when the roadway surface condition estimation value indicates a smooth surface, the suspension control system stiffens the vehicle suspension characteristics.

In another aspect of the invention, the roadway surface condition estimation value dictates a first suspension value used to adjust the suspension system accordingly. A user-selected second suspension value may also be included. When a user-selected second suspension value is present, the suspension control system adjusts the vehicle suspension characteristics as a function of the first and second suspension values. In one example, the suspension control system adjusts the vehicle suspension characteristics according to the second suspension value when the first and second suspension values are compatible, and adjusts the vehicle suspension characteristics according to the first suspension value when the first and second suspension values are incompatible. In this way, the user-selected value controls unless the road surface conditions indicate that ride and handling can be improved by modifying the suspension. This may be done to avoid the suspension components "bottoming out" (contacting hard stops), for example.

In another embodiment, the system mitigates rear wheel hop. The system includes a tire sensor located within each wheel of the vehicle and generating a tire signal comprising pressure, temperature and multi-axis acceleration data; at least one vehicle dynamics sensor providing a vehicle dynamics signal; a brake system for applying a braking torque to each of the vehicle wheels in response to a brake signal; and a controller communicating with the tire sensor and the at least one vehicle dynamics sensor. In response to the vehicle dynamics signal, controller generates the brake signal as a function of the multi-axis acceleration data of the tire signal, and transmits the brake signal to the brake system. The controller can generate the brake signal by comparing frequency and amplitude response characteristics of the rear tire signals, to frequency and amplitude response characteristics of the front tire signals to determine a rear wheel hop event. To mitigate the rear wheel hop event, braking maneuvers can be performed.

The embodiments of the present invention provide several advantages. One advantage provided by an embodiment of the present invention is a suspension control system that is capable of obtaining tire pressure and wheel acceleration knowledge and adjusting suspension control functions accordingly to improve vehicle ride and handling.

The present invention itself, together with further objects and attendant advantages, will be best understood by reference to the following detailed description, taken in conjunction with the accompanying drawings.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
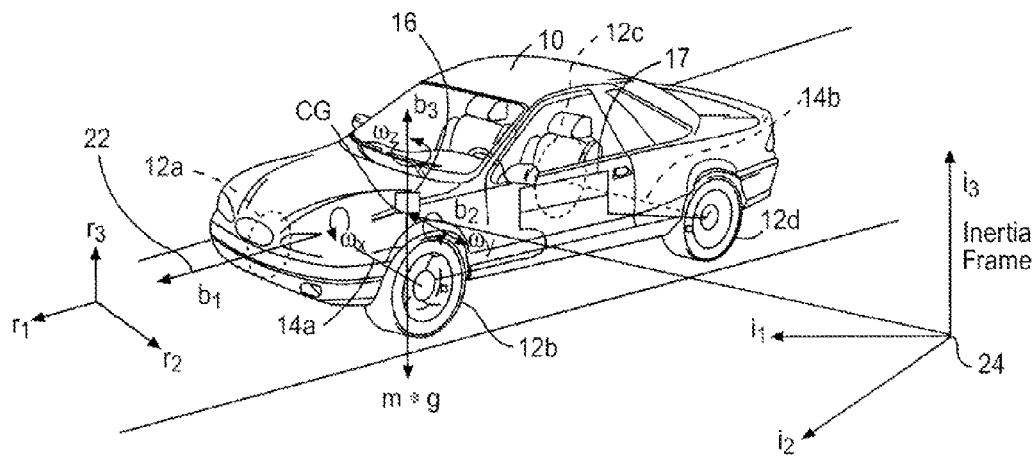
FIG. 1 is a block diagrammatic and perspective view of a vehicle with variable vectors and coordinate frames in accordance with an embodiment of the present invention.

In the following figures, the same reference numerals will be used to identify the same components. The present invention may be used in conjunction with vehicle control systems including a yaw stability control (YSC) system, roll stability control (RSC) system, lateral stability control (LSC) system, integrated stability control (ISC) system, or a total vehicle control system for achieving desired vehicle performance. The present invention is also described with respect to an integrated sensing system (ISS), which uses a centralized motion sensor cluster such as an inertial measurement unit (IMU) and other available, but decentralized, sensors. Although a centralized motion sensor, such as an IMU, is primarily described, the techniques described herein are easily transferable to using the other discrete sensors.

In the following description, various operating parameters and components are described for several constructed embodiments. These specific parameters and components are included as examples and are not meant to be limiting.

Referring to FIG. 1, an automotive vehicle 10 with a control system of the present invention is illustrated with the various forces and moments thereon. Vehicle 10 has front right (FRW) and front left (FLW) wheel/tires 12a and 12b and rear right (RRW) wheel/tires 12c and rear left (RLW) wheel/tires 12d, respectively. The vehicle 10 may also have a number of different types of front steering systems 14a and rear steering systems 14b, including having each of the front and rear wheels 12a, 12b, 12c and 12d configured with a respective controllable actuator, the front and rear wheels 12 having a conventional type system in which both of the front wheels 12a, 12b are controlled together and both of the rear wheels 12c, 12d are controlled together, a system having conventional front steering and independently controllable rear steering for each of the wheels 12c and 12d, or vice versa. Generally, the vehicle 10 has a weight represented as Mg at the center of gravity of the vehicle 10, where g=9.8 m/s² and M is the total mass of the vehicle 10.

The control system 11 has an active/semi-active suspension system, and may include rollover mitigation and prevention systems, which include and/or comprise of, an active steering system, a deployable lateral stability system, inwardly mounted wheel assemblies, and other related devices such as known in the art. The control system 11 may also be used with or include an anti-roll bar, or airbags or other safety devices deployed or activated upon sensing predetermined dynamic conditions of the vehicle 10.

The control system 11 is in communication with a sensing system 16. The sensing system 16 may have many different active and passive sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor and a longitudinal accelerometer. The sensing system 16 may also includes object detection sensors, which aid in the detection of an imminent rollover obstacle. The various sensors will be further described below and are shown with respect to FIGS. 2 and 4.

The sensors may also be used by the control system 11 in various determinations such as to determine a lifting event, determine a height and position of a mass, etc. Wheel speed sensors can be mounted at each corner of the vehicle and generate signals corresponding to the rotational speed of each wheel. The rest of the sensors of the sensing system 16 may be mounted directly on the center of gravity of the vehicle body, along the directions x, y, and z shown in FIG. 1. As those skilled in the art will recognize, the frame from $b_1$, $b_2$, and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame or chassis 22 as described below.

The angular rate sensors and the accelerometers may be mounted on the vehicle car body along the body frame directions $b_1$, $b_2$, and $b_3$ which are the x-y-z axes of the sprung mass of the vehicle.

The longitudinal acceleration sensor is mounted on the car body located at the center of gravity, with its sensing direction along $b_1$ axis, whose output is denoted as $a_x$. The lateral acceleration sensor is mounted on the car body located at the center of gravity, with its sensing direction along $b_2$ axis, whose output is denoted as $a_y$.

FIG. 1 depicts a road frame system $r_1 r_2 r_3$ that is fixed on the driven road surface, where the $r_3$ axis is along the average road normal direction computed from the normal directions of the four-tire/road contact patches.

Figure 2:
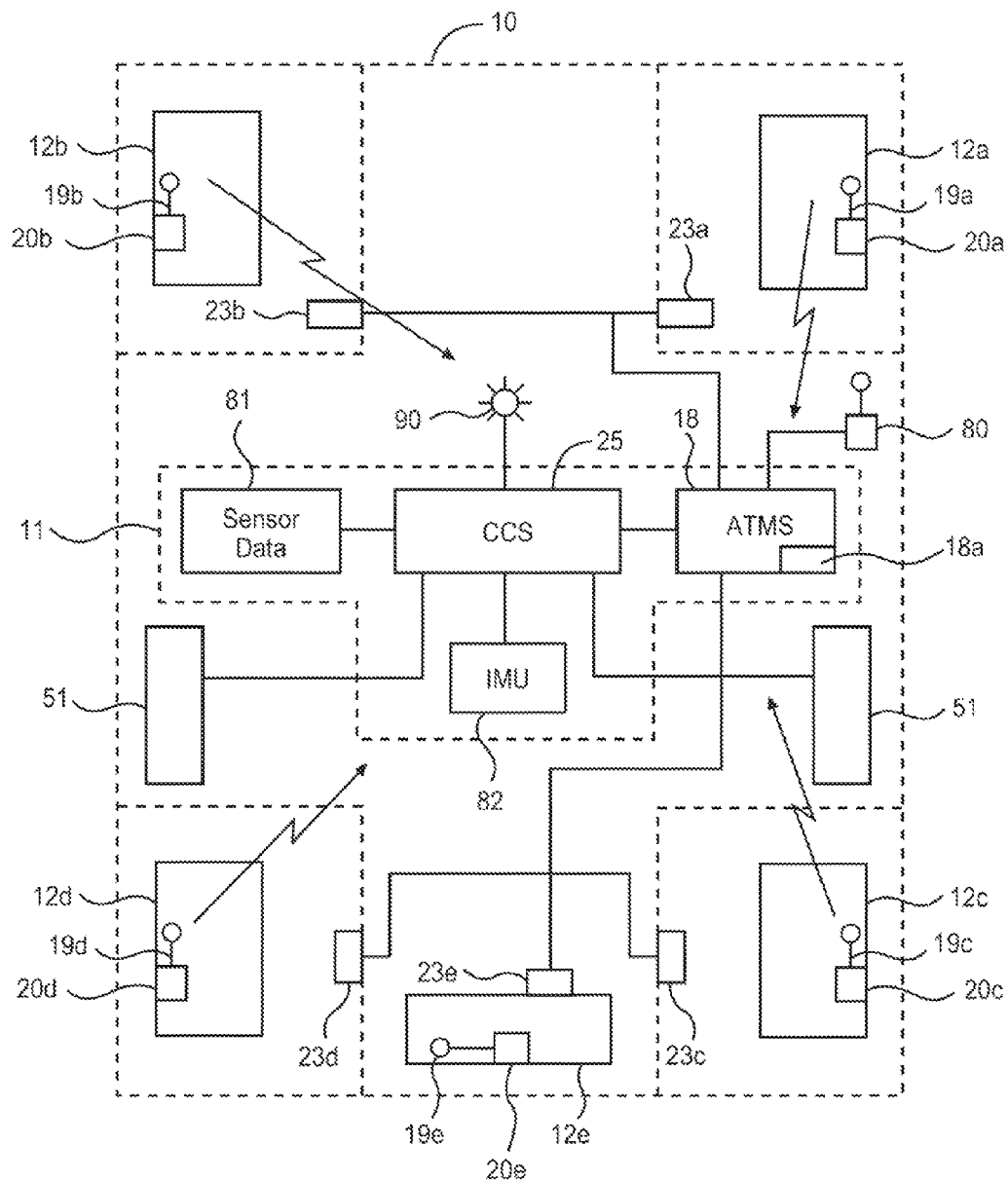
FIG. 2 is a block diagrammatic view of a tire monitoring system in accordance with an embodiment of the present invention.

Referring now to FIG. 2, a block diagrammatic view of an advanced tire monitoring system ATMS (18) for a vehicle 10 in accordance with an embodiment of the present invention is shown. The control system 11 includes a controller 25. The controller may be a controller for estimating a roadway surface condition and modifying a suspension characteristic in response to the estimated roadway surface conditions. Examples of such comfort and convenience control systems CCS 25 are described below. The control system 11 utilizes tire status information gathered from the advanced tire monitoring system ATMS 18 in operation of the controller 25. The ATMS 18 provides tire pressure, tire temperature and acceleration data to the control system 25. A sample advanced tire monitoring system is described in detail with respect to FIGS. 2 and 3. A sample comfort and convenience control system is described with respect to FIG. 4. Logic routines for different comfort and convenience functions are described with respect to FIGS. 5 through 10.

The control system 11 includes one or more controllers. The controllers may be part of the advanced tire monitoring system 18, the convenience control system 25, or may be a stand-alone controller. The convenience control system 25 may be coupled to other control systems to respond to safety, comfort or convenience events as detected by the logic routines and ATMS 18. Such control systems could include a brake control system that is used to actuate brakes; a suspension control system for activating suspension components to mitigate the effect of a detected event; a steering control system to likewise mitigate a detected event; active and passive safety control systems; a central tire inflation system, and the like. Control events related to safety, comfort or convenience may be, indicated to a vehicle occupant via an indicator 90.

Figure 4:
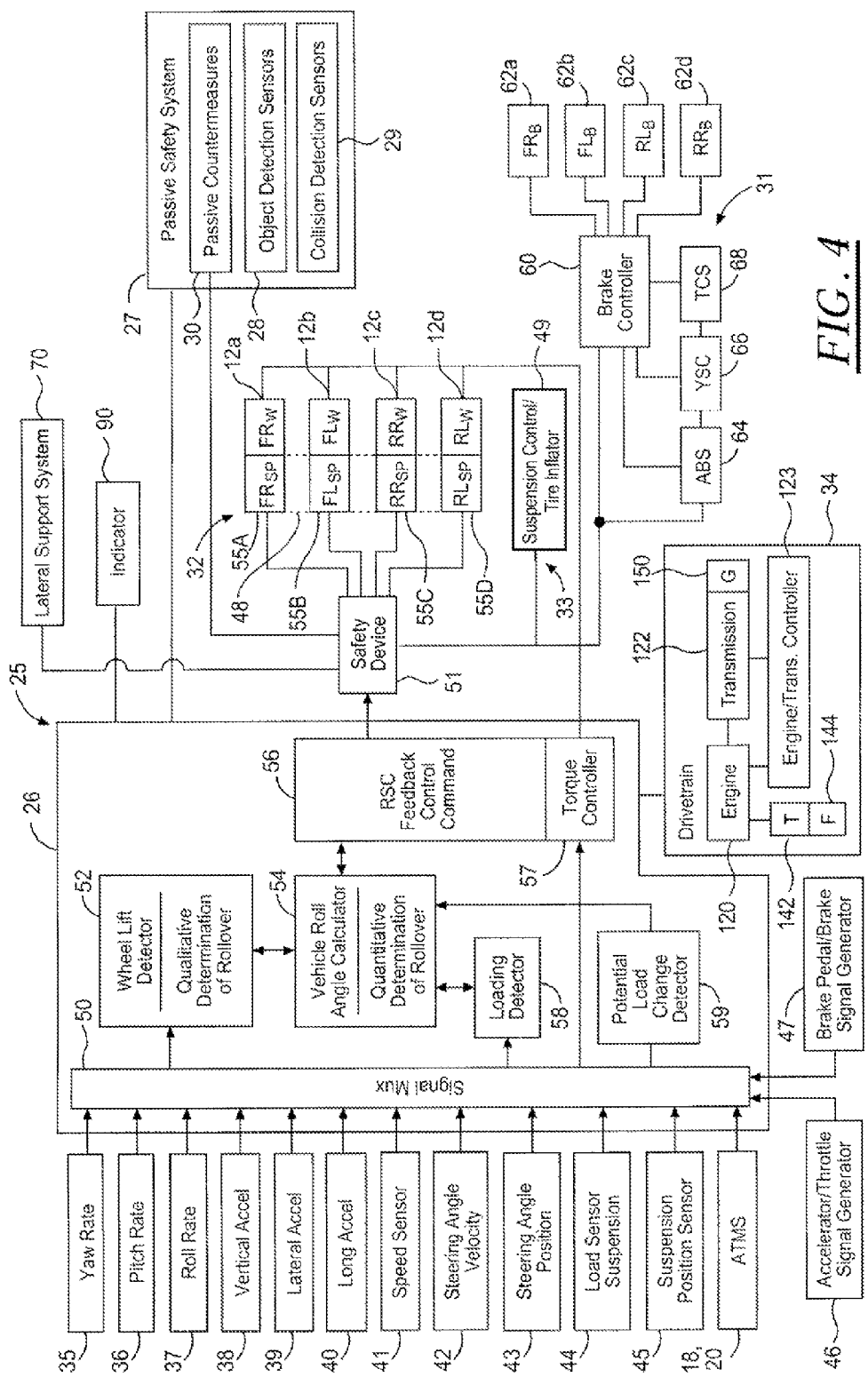
FIG. 4 is a block diagrammatic view of a control system, including a tire monitoring system for a vehicle in accordance with an embodiment of the present invention.

Several of the stated control systems are shown and described with respect to FIG. 4. Therein, the control system 11 is illustrated in further detail having a controller 26, a passive safety system 27-30, multiple active systems 31-34, various vehicle status sensors and driver or vehicle operator input sensors 20 and 35-47. The passive system 27 includes object detection devices or sensors 28, collision detection sensors 29, and various passive countermeasures 30. The active systems may include a brake control system 31, a steering control system 32, a suspension control system 33, and a drivetrain control system 34. Based upon inputs from the sensors, the convenience control system 25 may operate the safety device 51. Further, although it is shown as a safety device 51, it also activates the comfort and convenience features discussed herein, because several of the mechanisms provide dual roles in improving passenger comfort and mitigating safety-relate events.

The controllers described herein may be microprocessor based such as a computer having a central processing unit, memory (RAM and/or ROM), and associated input and output buses. The controllers may be application-specific integrated circuits or may be formed of other logic devices known in the art. The controllers may each be a portion of a central vehicle main control unit, an interactive vehicle dynamics module, a restraints control module, a main safety controller, a control circuit having a power supply, combined into a single integrated controller, or may be a stand-alone controller as shown.

Referring again to FIG. 2, the advanced tire monitoring system 18 monitors the air pressure, temperature and multi-axis accelerations for a right front tire 12a, a left front tire 12b, a right rear tire 12c, and a left rear tire 12d. Each tire 12a-12d has a respective tire ATMS sensor 20a-20d, each of which has a respective antenna 19a-19d. Each tire 12a-12d is positioned upon a corresponding wheel.

A fifth tire or spare tire 12e is also illustrated having an ATMS sensor 20e and a respective antenna 19e. Although five wheels are illustrated, the tire status of various numbers of wheels may be monitored. For example, the present invention applies equally to vehicles such as pickup trucks that have dual wheels for each rear wheel. Also, various numbers of wheels may be used in a heavy-duty truck application having dual wheels at a number of locations. Further, the present invention is also applicable to trailers and extra spares.

Each tire 12 may have a respective initiator 23a-23e positioned within the wheel wells adjacent to the tire 12. Initiator 23 generates a low frequency RF signal initiator and is used to initiate a response from each wheel so that the position of each wheel may be recognized automatically by the advanced tire monitoring system 18. Initiators 23 are coupled directly to the advanced tire monitoring system 18. In commercial embodiments where the position programming is done manually, the initiators may be eliminated.

The controller comprising the ATMS 18 may be microprocessor based controller having a programmable CPU that may be programmed to perform various functions and processes including those set forth herein. Controller has a memory 18a associated therewith. Memory 18a may be various types of memory including ROM or RAM. The memory is used to store various thresholds, calibrations, tire characteristics, wheel characteristics, serial numbers, conversion factors, temperature probes, spare tire operating parameters, and other values needed in the calculation, calibration and operation of the advanced tire monitoring system 18. For example, memory may contain a table that includes the sensor identification. Also, the warning status of each of the tires may also be stored within the table.

The ATMS 18 is also coupled to a transceiver 80. Although the transceiver 80 is illustrated as a separate component, the transceiver 80 may also be included within ATMS 18. The transceiver 80 has an antenna associated therewith. The antenna is used to receive pressure, temperature and multi-axis acceleration information from tire ATMS sensors 20a-20e. One transceiver may be used for all of the tire ATMS sensors 20, or a front and rear transceiver may be used, or dedicated transceivers may be used, each in communication with the ATMS 18. The ATMS 18 performs preprocessing before placing the tire data on the vehicle communications bus (CAN) or other digital protocol for transmission to the convenience control system 25.

In the example shown, the convenience controller 25 is also coupled to a plurality of sensors 81 and other measurement and control systems such as an IMU 82. The sensors 81 may include a barometric pressure sensor, an ambient temperature sensor, an object detection sensor, a speed sensor, a brake pedal sensor, a throttle position sensor, steering wheel position sensor, and an ignition sensor. Sensor data may also be provided such as suspension position and loading. Of course, various other types of sensors may be used. A barometric pressure sensor generates a barometric pressure signal corresponding to the ambient barometric pressure. Thus, barometric pressure compensation may be used, but is not required in the calculation for determining the pressure within each tire 12. The ambient temperature signal corresponding to the ambient temperature and may also be used to generate a temperature compensated pressure profile. The sensor data 81 may also be preprocessed before being communicated to the convenience control system 25.

The inertial measurement unit (IMU) 82 contains inertial sensors for detecting vehicle yaw, pitch and roll. This data is communicated to the convenience control system 25 (when used as part of a safety control system) in order to determine whether a rollover event exists. This data can also act to initiate the ATMS 18 when a potential for rollover exists, or indicate that data collection from the ATMS sensors 20 is desirable.

Safety, comfort and convenience devices are generally indicated at 51. Safety devices may include restraints components such as seat mounted side airbags or side curtain airbags, seat belt pretensioners, deployable trim panels and the like. To prevent or mitigate a rollover event, safety devices 51 may also include vehicle lateral support systems, wheel sets or active suspension components. Comfort and convenience devices may include suspension components such as active bushings or linkages and, pneumatic or hydraulic cylinders. They may also include a centralize tire inflator for changing the amount of tire pressure at each of the tires 12.

Control system 25 may also be coupled to an indicator 90. The indicator 90 may include a video system, an audio indicator, a heads-up display, a flat-panel display, a telematic system, a dashboard indicator, a panel indicator, or other indicator known in the art. In one embodiment of the present invention, the indicator 90 is in the form of a heads-up display and the indication signal is a virtual image projected to appear forward of the vehicle 10. The indicator 90 provides a real-time image of the target area to increase the visibility of the objects during relatively low visible light level conditions without having to refocus ones eyes to monitor an indication device within the vehicle 10. Indicator 90 may provide some indication as to the operability of the system such as confirming receipt of a signal such as a calibration signal or other commands, warnings, and controls. Indicator 90 may also alert the vehicle operator with respect to tire pressure data, a safety event, or a comfort or convenience event.

Figure 3:
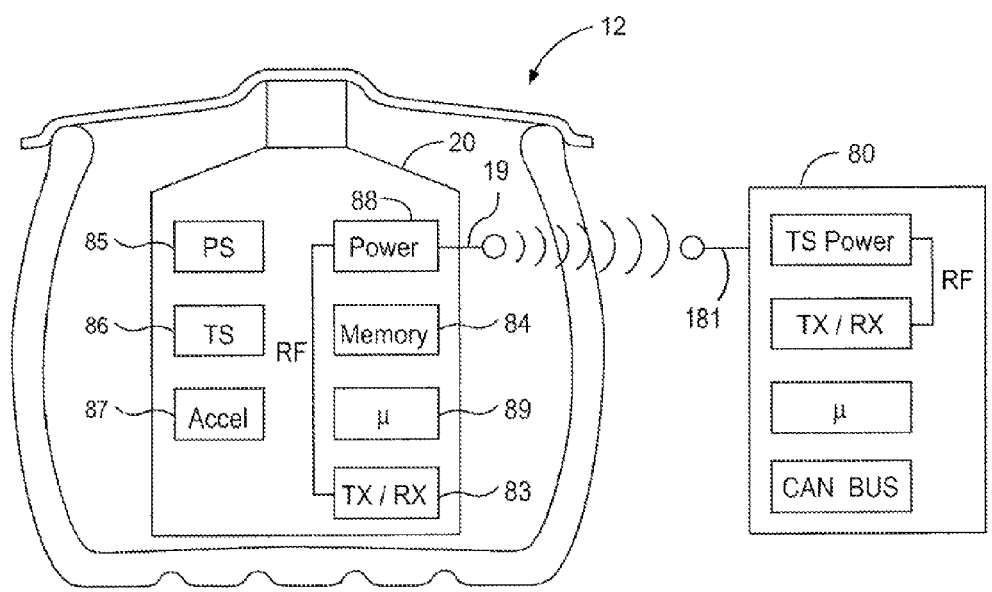
FIG. 3 is a block diagrammatic view of a tire sensor according to an embodiment of the present vehicle control system.

Referring now also to FIG. 3, a schematic view of an advanced tire monitoring system (ATMS) sensor 20 in accordance with an embodiment of the present invention is shown. The ATMS sensor 20 is illustrated mounted to a rim of a vehicle wheel 12 inside the tire. The sensor has a transmitter/receiver or transceiver 83. The transmitter/receiver 83 is coupled to antenna 19 for transmitting information to transceiver 80. The transmitter/receiver 83 may be used to receive an activation signal from an initiator 23 located at each wheel, if an initiator is used in the particular application. The sensor circuit 20 may have various information such as a serial number memory 84, a pressure sensor 85 for determining the pressure within the tire, a temperature sensor 86 for determining the temperature within the tire, and a motion detector in the form of a multi-axis accelerometer 87. Preferably, the accelerometer 87 is a MEMS device. The accelerometer may be used to activate the advanced sensing system. The initial message is referred to as a "wake" message, meaning the sensor sensing circuit is now activated to send its pressure transmissions and the other data.

Each of the transceiver 83, memory 84, pressure sensor 85, temperature sensor 86, and motion sensor 87 are coupled to a power source such as a battery 88. The battery 88 may be a long-life battery capable of lasting the life of the tires. In another aspect, the battery may be omitted, or have a substantially smaller capacity. An energy scheme using an RF field generated by an antenna on the vehicle, such as antenna 181, can be used to power the sensor circuit 20. This is generally indicated in FIG. 3 by the RF signal path in both sensor circuit 20 and transceiver circuit 80. A self-generating energy scheme may also be used wherein the device 20 scavenges energy from the rotational movement of the tires. Such schemes may permit continuous sensor data transmission and/or longer sensor life when equipped with a battery supply.

A sensor function monitor 89 in the form of a microcontroller core or state machine, for example, may also be incorporated into ATMS sensor 20 circuit. The sensor function monitor 89 generates an error signal when various portions of the ATMS circuit are not operating or are operating incorrectly. Also, sensor function monitor may generate a signal indicating that the circuit is operating normally. The ATMS function monitor microcontroller 89 can locally pre-process the sensor data streams prior to wireless delivery to the vehicle transceiver. It also provides a supervisory function to control the overall operation of the sensor including processing, diagnostics and error detection.

The transceiver 80 in communication with the ATMS sensor 20, similarly includes a power source, transmitter/receiver device, microcontroller and antenna. It also includes an interface for the vehicle communications bus (CAN bus). Thus, each ATMS sensor 20 communicates wirelessly with the controller 18 for at least a portion of its communication path. The transceiver 80 receives either the raw sensor data or the pre-processed sensor data from the tire sensors and communicates with the ATMS 18 for further processing with defined algorithms.

An advantage of the ATMS sensors 20 just described is that it provides temperature and pressure data for each tire, as well as x, y and z acceleration data for each tire. This acceleration data is generated much more directly than vehicle acceleration data generated by conventional IMU sensing systems. Traditional IMU systems determine roll, pitch and yaw above the vehicle suspension. Thus, signal propagation is delayed and/or modified with other stimuli and transfer functions because of the distance of the signal source, i.e., what is occurring at the contact patches of the tires or to the tires themselves. The ATMS sensors 20 of the present invention reduce the signal propagation path and latency because they are distributed very close to the road surface and other inputs, such as objects impacting the tires. The ATMS sensors 20 allow data signals directly from the relevant tire/wheel. Items such as road surface characteristics, impacts and/or obstacles, tire defects, wheel defects and suspension defects can all be monitored by signature analysis of the wheel data provided by the ATMS sensors 20.

Referring to FIG. 4, a block diagrammatic view of a convenience control system 25 in accordance with an embodiment of the present invention is shown. The convenience control system 25 may consist of a rollover stability controller RSC 56, as shown. It can also be a stand-alone system receiving input from only the ATMS sensors 20 and a limited number of other sensors. In this example, however, the convenience control system monitors many sensor inputs, including inputs from ATMS sensors 20 located at each wheel/tire of the vehicle. Front right (FR) and front left (FL) wheel/tires 12a and 12b and rear right (RR) wheel/tires 12c and rear left (RL) wheel/tires 12d, respectively, are shown and may be part of a vehicle, such as the vehicle 10. The vehicle may also have a number of different types of front steering systems and rear steering systems, including having each of the front and rear wheels configured with a respective controllable actuator, the front and rear wheels having a conventional type system in which both of the front wheels are controlled together and both of the rear wheels are controlled together, or a system having conventional front steering and independently controllable rear steering for each of the wheels or vice versa.

The convenience control system 25 includes the controller or integrated sensing system (ISS) 26, which signals the safety device 51, the suspension control 49; the engine/transmission controller 123 and the brake controller 60 in response to information received from the ATMS 18, and the sensor cluster 50. In other application, as described below, the ISS 26 may only indicate to the vehicle operator a sensed condition, without taking any other active measures to alter the sensed condition.

The controller 26 as well as the suspension control 49, the brake controller 60, and the engine/transmission controller 123 may be microprocessor based such as a computer having a central processing unit, memory (RAM and/or ROM), and associated input and output buses. The controllers 26, 49, 60, and 123 may be application-specific integrated circuits or may be formed of other logic devices known in the art. The controllers 26, 49, 60, and 123 may each be a portion of a central vehicle main control unit, an interactive vehicle dynamics module, a restraints control module, a main safety controller, a control circuit having a power supply, combined into a single integrated controller, or may be a stand-alone controller as shown. The controllers 26, 49, 60, and 123 may be configured to be mounted and located within a vehicle dashboard or vehicle panel or in some other location on the vehicle 10.

The controllers and devices in communication with the ISS 26 are described below. Thereafter, the inputs to the ISS 26 are described.

Referring to FIG. 4, a passive safety system may be in communication with the controller or ISS 26. The passive safety system 27 includes collision detection sensors 29, object detection sensors 28, and passive countermeasures 30. The object detection sensors 28 monitor the environment around the vehicle 10 and generate object detection signals upon detection of an object. The object detection sensors 28 may be infrared, visible, ultrasonic, radar, active electro-magnetic wave-ranging, or lidar based, a charged-coupled device, a series of photodiodes, or in some other form known in the art. Wave-ranging devices may include radar, lidar, stereo camera pairs, 3-D imagers, with active infrared illumination, or other wave-ranging devices known in the art. Vision sensors may refer to robotic cameras or other visual imaging cameras. The wave-ranging sensors and the vision sensors may be monocular or binocular and may be used to obtain height, width, depth, range, range rate, angle, and any other visual aspect information. Monocular cameras may be used to obtain less accurate and less reliable range and range rate data as compared to binocular cameras. The object detection sensors 28 may also be in the form of an object indicator. The object detection sensors 28 may be in various locations on the vehicle and any number of each may be utilized. The object detection sensors may also include occupant classification sensors (not shown). With respect to tripped rollover events, object detection sensors 28 detect objects which may cause a tripped rollover.

The collision detection sensors 29 are used to detect a collision and more particularly, a side collision. The collision detection sensors 29 may also be located anywhere on the vehicle 10 and generate collision detection signals in response to a collision. The collision detection sensors 29 may include sensors that are used as vehicle status sensors, such as the yaw rate sensor 35, the lateral acceleration sensor 39, and the longitudinal acceleration sensor 40. The collision detection sensors 29 may also be in the form of an accelerometer, a piezoelectric sensor, a piezo-resistive sensor, a pressure sensor, a contact sensor, a strain gage, or may be in some other form known in the art.

The passive countermeasures 30 may include internal air bag control, seatbelt control, knee bolster control, head restraint control, load limiting pedal control, load limiting steering control, seatbelt pretensioner control, external air bag control, pedestrian protection control, and other passive countermeasures known in the art. Air bag control may include control over front, side, curtain, hood, dash, or other type of airbags known in the art. Pedestrian protection may include a deployable vehicle hood, a bumper system, or other pedestrian protective devices.

The brake control system 31 can also be in communication with the ISS controller 26. The brake control system 31 includes the brake controller 60 that actuates front vehicle brakes 62a and 62b and rear vehicle brakes 62c and 62d. The vehicle brakes 62 are associated with the wheels 12a-12d. The brakes 62 may be independently actuatable through the brake controller 60. The brake controller 60 may control the hydraulic system of the vehicle 10. Of course, electrically actuatable brakes may be used in the present invention. The brake controller 60 may also be in communication with other safety systems such as an antilock brake system 64, a yaw stability control system 66 and a traction control system 68.

The steering control system 32, which may also communicate with the ISS controller 26, can include a number of different types of front and rear steering systems including having each of the front and rear wheels 12a-12d configured with respective controllable adjusting elements 55A-D. The wheels 12 may be controlled together or individually. The ISS controller 26 may control the position of the front right wheel adjusting element 55A, the front left wheel adjusting element 55B, the rear left wheel adjusting element 55D, and the right rear wheel adjusting element 55C. Although as described above, two or more of the adjusting elements may be simultaneously controlled. For example, in a rack-and-pinion system, the two wheels coupled thereto are simultaneously controlled. Based on the inputs from sensors 35-47 and from the ATMS 18, the ISS controller 26 controls the steering position and/or braking of the wheels. Thus, with respect to the steering control system 32, the adjusting elements 55 permit directional control of the particular wheel.

The controller 26 may also communicate with the suspension control system 33. The suspension control system 33 includes the suspension control 49, the suspension 48, and the suspension adjusting elements 55A-55D ($FR_{SP}$, $FL_{SP}$, $RR_{SP}$, $RL_{SP}$) that are associated with each wheel 12. The suspension control 49 and adjusting elements 55A-55D may be used to adjust the suspension 48 to prevent rollover. The adjusting elements 55A-55D may include electrically, mechanically, pneumatically, and/or hydraulically operated actuators, adjustable dampers, or other known adjustment devices, and are described below in the form of actuators. The adjusting elements 55 may allow for active modification of the suspension response or geometry. For example, they may comprise active dampers. The adjusting elements 55 may also be bushings which can electronically decouple the sway bar associated with a wheel to enhance suspension articulation. Another example is a bushing comprising magnetorheological fluid and oil allowing it to articulate within the wheel joint to alter suspension geometry and/or the wheel's NVH characteristics. In a further example, the suspension components 55 may be pneumatic cylinders. The suspension control system 33 may also operate to adjust the tire pressure with central tire inflation capability. For instance, the tire pressure may be lowered to traverse softer road conditions. This feature can be used in response to a road surface characteristic detection as described below, or a low tire pressure signal.

The controller 26 may also be in communication with the drivetrain control system 34. The drivetrain control system 34 includes an internal combustion engine 120 or other engine known in the art. The engine 120 may have a throttle device 142 coupled thereto, which is actuated by a foot pedal 144. The throttle device 142 may be part of a drive-by-wire system or by a direct mechanical linkage between the pedal 144 and the throttle device 142. The engine controller 123 may be an independent controller or part of the controller 26. The engine controller 123 may be used to reduce or increase the engine power. While a conventional internal combustion engine is contemplated, the vehicle 10 could also be powered by a diesel engine or an electric engine or the vehicle could be a hybrid vehicle utilizing two or more types of power systems.

The drivetrain system 34 also includes a transmission 122, which is coupled to the engine 120. The transmission 122 may be an automatic transmission or a manual transmission. A gear selector 150 is used to select the Various gears of the transmission 122. The gear selector 150 may be a shift lever used to select park, reverse, neutral, and drive positions of an automatic transmission. Of course, in the case of electric vehicles, electric motors may replace the conventional engine/transmission setup shown in this example.

Safety device 51 may control one or more passive safety countermeasures such as airbags 30 or a steering actuator 55A-D at one or more of the wheels 12a, 12b, 12c, 12d of the vehicle. The safety device 51 may also operate the suspension control/tire inflator 49 as described above.

A lateral support system 70 may also be in communication with the convenience controller 26, either directly or through the safety device 51. The lateral support system 70 is adapted to mitigate tripped rollover events. It can include a deployable set of linkages and one or more arms, which each have a wheel set attached to the outwardly extending end thereof. The inward end of the arm is attached to a deploying mechanism. In normal driving conditions the wheels sets are not in contact with the driving surface. The lateral support system 70 may also or alternatively include laterally deployable airbags. The airbags are also outwardly deployed to prevent or mitigate a tripped rollover. The airbags may be deployed from any location on the vehicle 10 and any number of airbags may be utilized.

Indicator 90 may also be in communication with the convenience controller 26 directly, or indirectly though the safety device 51. It may be used to indicate to a vehicle operator various vehicle-related and status information.

In this example, the controller 26 receives numerous inputs to aide in determining vehicle dynamic conditions. For example, it may determine whether a rollover event is in progress or is imminent. The controller 26 may include a signal multiplexer 50 that receives the signals from the sensors 20 and 35-47. In this example, the signal multiplexer 50 provides the signals to a roll stability control (RSC) feedback control command 56 which is part of the convenience controller 25. As mentioned above, however, the convenience system could be implemented with many fewer sensor inputs and, indeed, may only receive input from ATMS sensors 20 to determine the roadway surface conditions and other convenience functions described below.

The controller 26 takes advantage of the information provided by the advanced tire monitoring sensors 20 described above, as well as the traditional vehicle dynamics sensors 35-47 in monitoring for potential rollover events and other vehicle and roadway dynamics. Thus, the acceleration data, temperature data and pressure data for each wheel is analyzed in various safety schemes described in further detail with respect to FIGS. 5 through 10. Heretofore, control systems have not considered coordinate acceleration data at each wheel. Rather, such vehicle and roadway data was only determined by means such as conventional IMU units, typically with reference to the body center frame, and located above the suspension line of the vehicle.

Briefly, the vehicle status sensors 35-47 may include the yaw rate sensor 35, the pitch rate sensor 36, the roll rate sensor 37, the vertical acceleration sensor 38, lateral acceleration sensor 39, longitudinal acceleration sensor 40, the speed sensor 41, the steering wheel angle velocity sensor 42, the steering angle (of the wheels or actuator) position sensor 43, the suspension load sensor 44, the suspension position sensor 45, the accelerator/throttle signal generator 46, and the brake pedal/brake signal generator 47. It should be noted that various combinations and sub-combinations of the sensors may be used. The steering wheel angle sensor 42, the accelerator/throttle signal generator 46, and the brake pedal/brake signal generator 47 are considered driver input sensors, since they are associated with a pedal, a wheel, or some other driver input device. Depending on the desired sensitivity of the system and various other factors, not all the sensors 35-47 may be used in a commercial embodiment. These sensors may be used in a conventional rollover stability control scheme, if the vehicle is so equipped, as in this example. One example of a rollover stability control scheme using such sensors, as well as an advanced tire monitoring system is disclosed in U.S. patent application Ser. No. 11/693,131, which is incorporated by reference herein. In the comfort and convenience schemes discussed below, however, the control method is based on feedback from the ATMS 18 alone, or in combination with only one or a few other sensor inputs such as the driver input and vehicle speed. Thus, the remaining sensors 35-47 are only included for completeness, and may only act as confirmatory sensors to the detected condition based on the ATMS 18 data.

The vehicle dynamic sensors 35-40 may be located at the center of gravity of the vehicle 10. Those skilled in the art will recognize that the sensors may also be located off the center of gravity and translated equivalently thereto.

Figure 5:
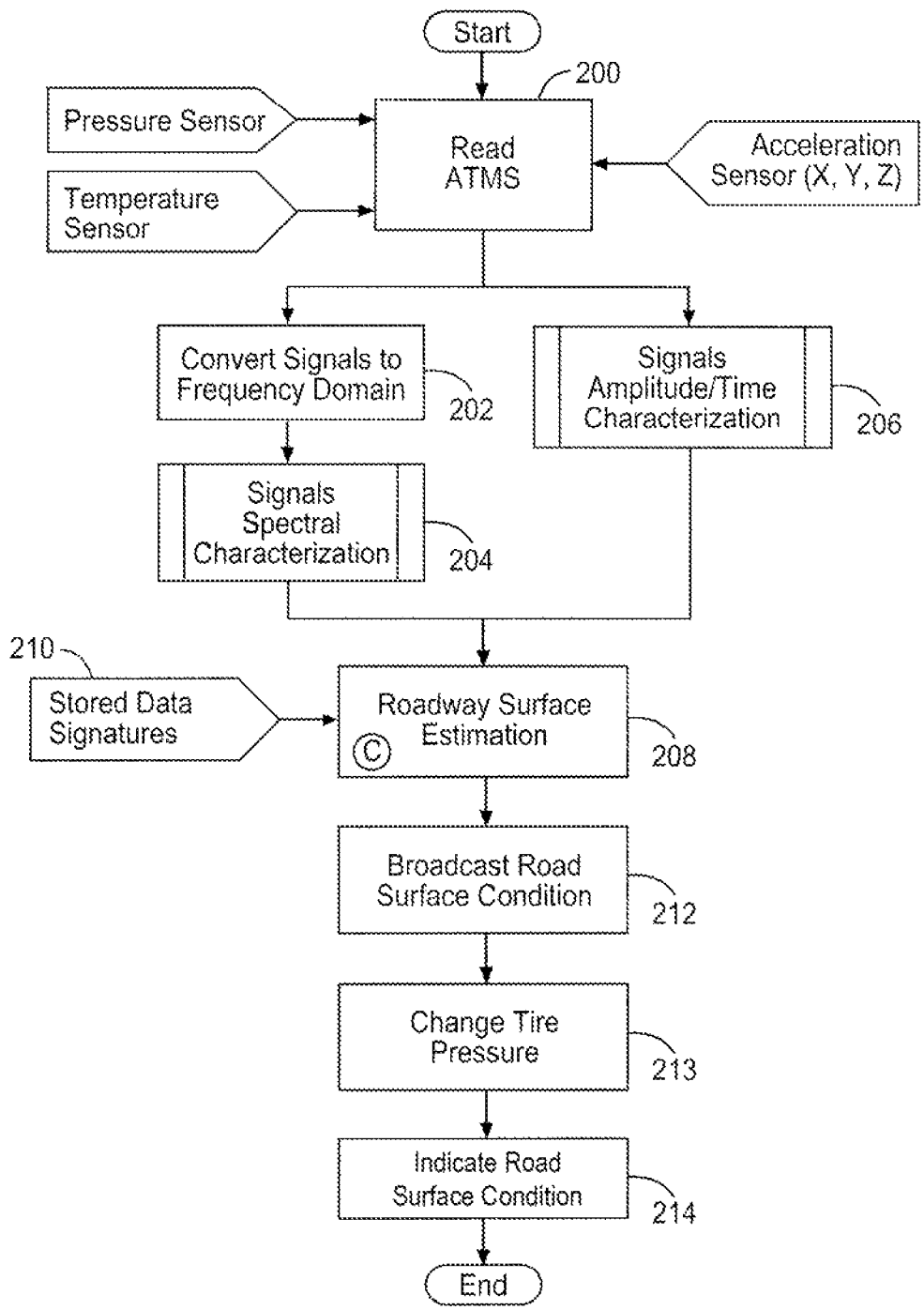
FIG. 5 is a logic diagram illustrating a method of operating a control system of a vehicle in accordance with an embodiment of the present invention providing road surface characteristic estimation.

FIG. 5 is a logic flow diagram illustrating a method of operating a control system of a vehicle in accordance with an embodiment of the present invention providing roadway surface condition estimation. Although the following steps are described primarily with respect to the embodiments of FIGS. 1-4, they may be modified and applied to other embodiments of the present invention, including vehicle embodiments wherein less than all sensors 35-47 are included. Indeed, in this example, only an ATMS sensor 20 at each wheel and vehicle speed data are analyzed.

In general terms, the roadway surface condition estimation scheme detects the type of road surface being traversed by the vehicle, and actively adjusts vehicle sub-systems accordingly to improve the ride comfort and/or vehicle handling. Roadway surfaces are differentiated by an analysis of the tire acceleration signals provided by the ATMS sensor 20 at each wheel. Rough road surfaces such as dirt roads exhibit higher acceleration signal and spectral content, i.e., acceleration frequency components, in the X and Z axis as compared to smooth road surfaces such as asphalt roads. On this basis, roadway surfaces can be detected, and suspension and/or tire adjustments can be made to improve vehicle ride and handling. Other road surface conditions can also be discerned such as ice, water, gravel, snow, etc.

Figure 6:
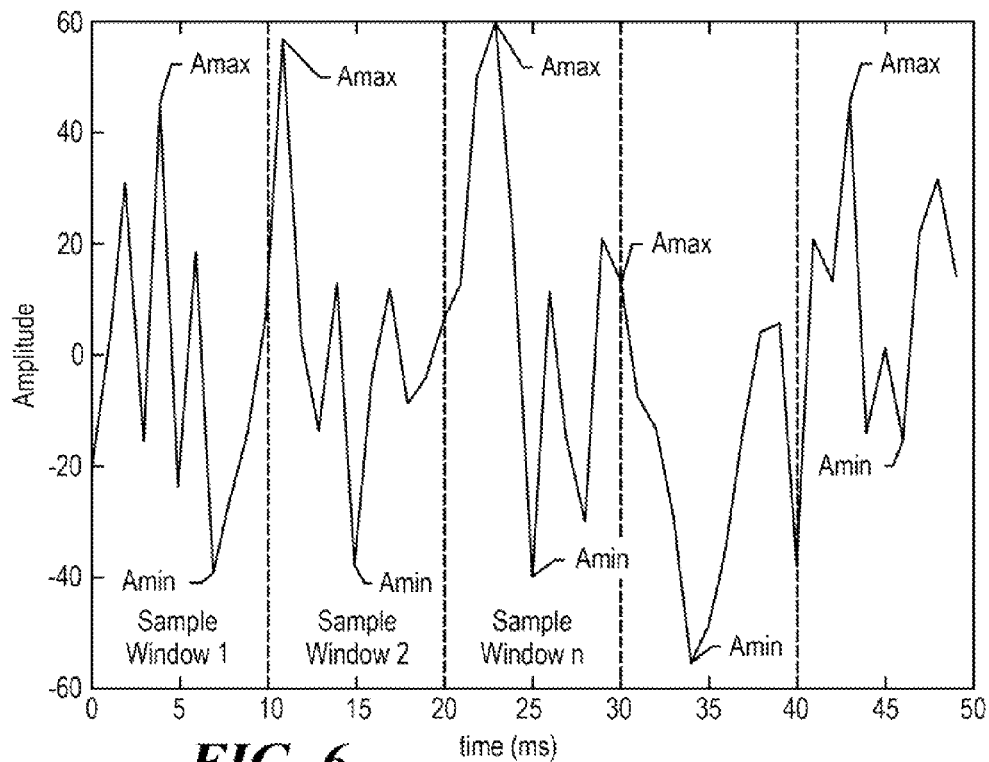
FIG. 6 is a graphical representation of ATMS sensor amplitude-time response data.
Figure 7:
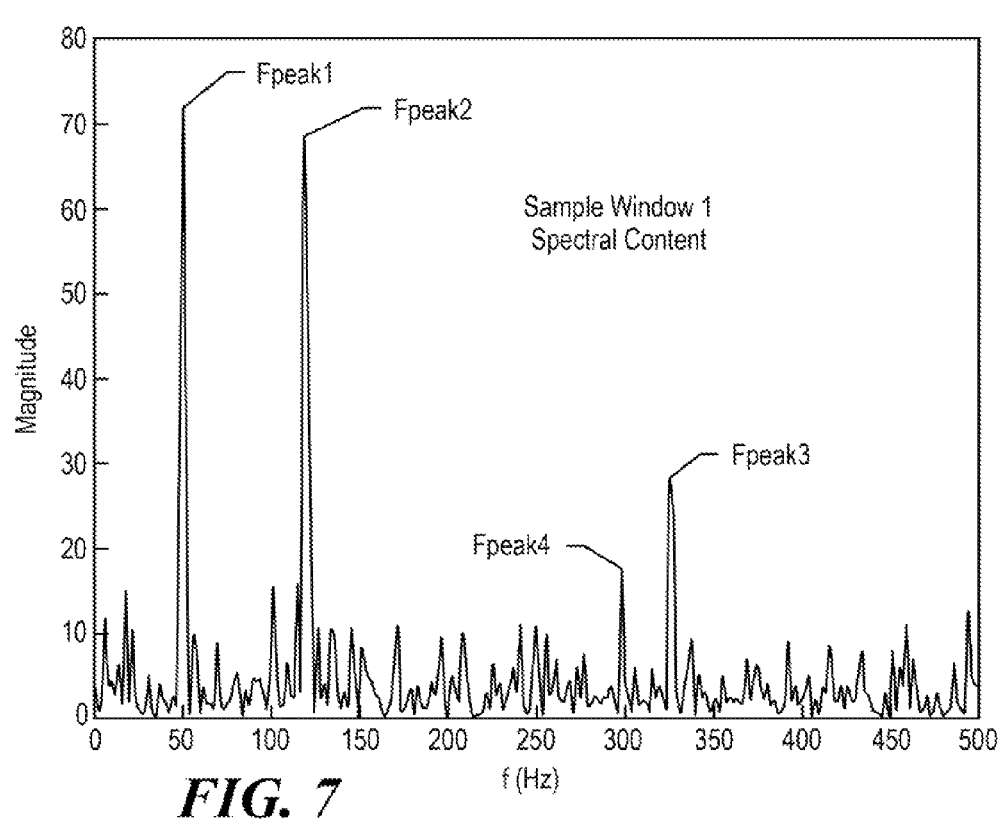
FIG. 7 is a graphical representation of ATMS sensor magnitude-frequency response data.

Referring to FIG. 5, in step 200, tire signals are generated, which are indicative of the current tire pressure, temperature and multi-axis accelerations within each tire of the vehicle. This information is provided by the advanced tire monitoring system sensors 20. Steps 202, 204 and 206 preprocess the data generated by the ATMS sensors 20. In the block 202 the data is segmented and parsed into discrete time windows and transformed from the time domain into the frequency domain using the Fourier Transform (FT) techniques. Alternate embodiments may use other frequency transformation techniques such as wavelet transformation techniques to transform the time domain data into its frequency domain representation. In block 206 the signal amplitude-time data is parsed into discrete time windows and signal amplitude vs. time table is generated for each time window for each of the sensor data as shown in FIG. 6. The generated tables are used in the subsequent algorithm blocks and are compared to known stored road surface conditions tables to determine the current road surface conditions. In block 204 a signal magnitude vs. frequency table is generated for each time window as shown in FIG. 7. The generated tables are used in the subsequent algorithm blocks and are compared to known stored road surface conditions tables to determine the current road surface conditions. As mentioned above, because the data is generated inside each tire for the vehicle, the signature profiles of the sensor data provide direct insight into what each tire is experiencing while it contacts the road surface. This data is generated much more directly than vehicle acceleration data generated by conventional IMU sensing systems because traditional IMU systems determine roll, pitch and yaw and coordinate accelerations above the vehicle suspension. The ATMS sensors 20 eliminate signal propagation through the suspension, and provide a clearer "view" of the vehicle dynamics.

The preprocessed ATMS sensor data is then analyzed according to roadway surface condition estimation criteria in step 208. A more detailed explanation of the roadway surface condition estimation criteria is provided in the example of FIG. 8. In this example, the ATMS sensor signals are compared to stored sensor frequency response signatures and stored amplitude/time response signatures from block 210.

The robustness of the system can be improved further by combining a wheel slip analysis with the ATMS data analysis. For example, the longitudinal wheel slip of a given wheel can be determined according to:

$$S=(wr/v)-1 \quad (1)$$

wherein w is the wheel's angular velocity, r is the radius of the tire, and v is the linear wheel/tire velocity. This slip value can then be compared to sensed ATMS data to confirm the roadway surface condition estimation.

The determined roadway surface condition estimation is then broadcast to other vehicle subsystems. This may include safety modules such as the active/passive safety systems, ABS, RSC, or integrated vehicle dynamics controller. By broadcasting the roadway surface conditions, these other systems can then optimize their performance based upon the sensed roadway surface. For instance, if a rollover event is declared, but the roadway surface conditions are not optimal (for example, slippery conditions), the thresholds that are used in activating or initiating interventions may be adjusted, scaled, opened, or relaxed, to alter intervention timing. In such situations, earlier interventions may be desired. In another example of broadcasting, a pre-arm signal for safety-related countermeasures based upon the ATMS data may be generated. Pre-arming would be appropriate for the roll stability control system as well as the restraints control system. The brake pressure applied during any intervention or countermeasure may also be modified as a result of the roadway surface estimation. For instance, the brake pressure may be tiered based on the contact patch conditions at each tire: full range or maximum brake pressure range, a reduced range or brake pressure limiting range, and an inactive range or brake pressure prevented range. When the contact patch surface roughness is estimated to be high or greater than or equal to a first surface roughness threshold value, the control system may apply a brake pressure up to a maximum threshold. In those cases, the full range brake control functions are maintained. When the surface roughness estimate of a tire of concern is in the reduced range or between a first roadway surface roughness threshold TPT1 and a second roadway surface roughness threshold TPT2, the control system may apply a reduced or limited brake pressure, which is less than that which would normally be applied. In the reduced range the amount that the brake pressure is limited is gradually or progressively increased. This increase may be linear, may be non-linear, or may result using some other relationship. When the roadway surface roughness estimate of a tire of concern is less than or equal to the second threshold TPT2, the control system is prevented from applying brake pressure. Although the control system is prevented from applying a brake pressure, brake pressure may be applied manually by a vehicle operator. In another embodiment, the control system can override the manual brakes and limits or prevents manual brake pressure.

Optionally, in step 213, the tire pressure may be changed in response to the detected roadway surface condition and/or merely on a low or high tire pressure indication. This may be accomplished by the central tire inflation device 49 (FIG. 4), if the vehicle is so equipped. Thus, if the tires are at a lower than normal, pressure, and the roadway surface is hard, the tire should be inflated to reduce the potential for tire de-beading, de-treading, or other tire damage associated with low pressure driving. Similarly, the tires may be maintained or put in a low pressure state to improve soft road condition handling (sand, loose gravel). When the vehicle encounters a hard surface for sufficient length of time, the ATMS 18 would indicate the roadway surface condition, and the tires could be inflated to a more appropriate pressure.

In step 214, the control system may also indicate via an indicator, such as the indicator 90 (FIG. 4), to a vehicle operator the roadway surface condition and/or the status of each tire. The control system may indicate that a tire pressure is low and the extent thereof. This information may also be stored, viewed, and downloaded for future review and/or evaluation. The viewing and downloading may be to an offboard or offsite system. The control system may also indicate to a vehicle operator that active tasks are being performed and the status of the vehicle. This indicated information may also be stored, viewed, and downloaded for future review and/or evaluation. The viewing and downloading may be to an offboard or offsite system.

The above tasks may be performed via any one or more of the herein mentioned controllers, control systems, stability control systems, or the like.

The above-described steps are meant to be illustrative examples; the steps may be performed sequentially, synchronously, simultaneously, or in a different order depending upon the application.

Figure 8:
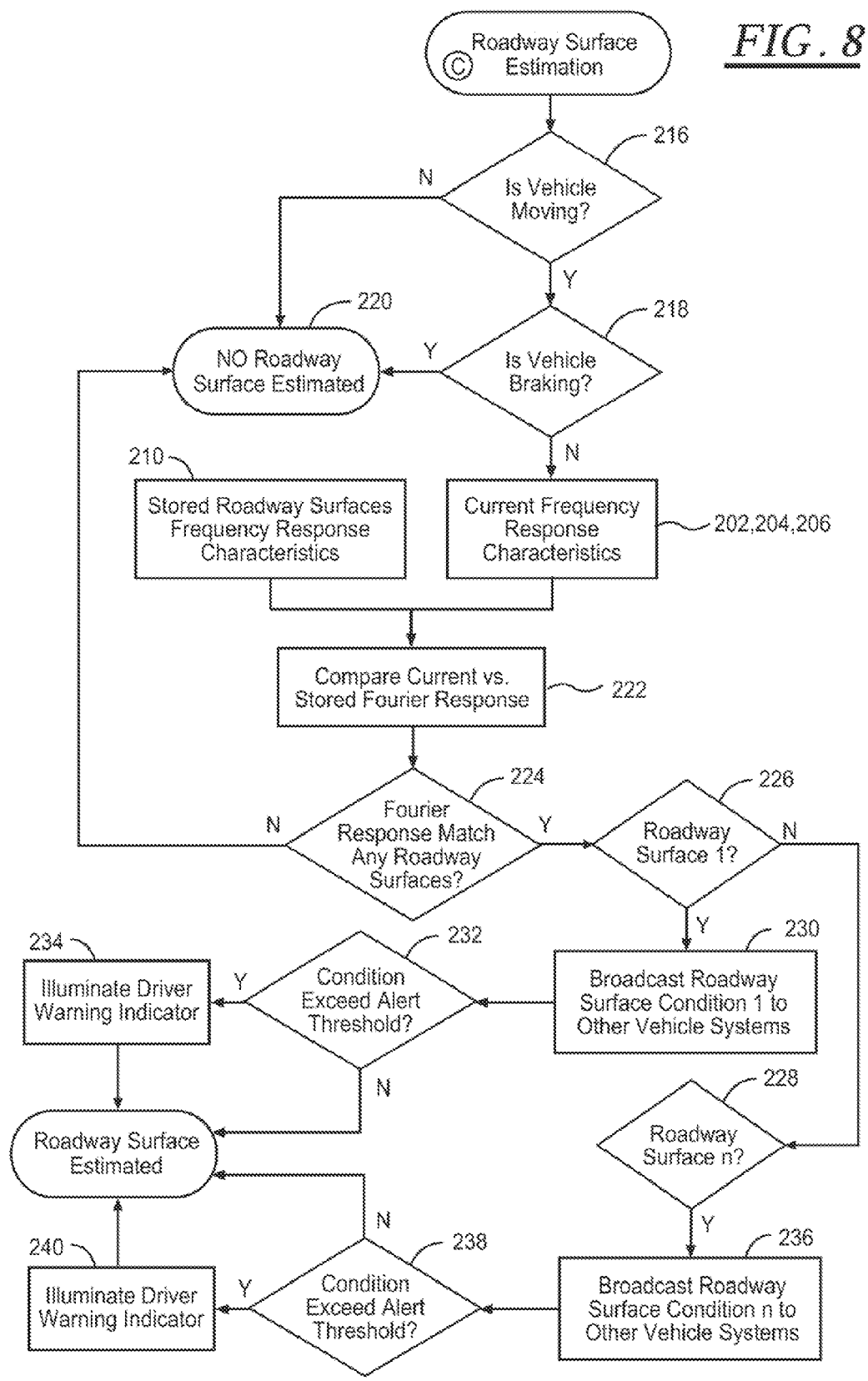
FIG. 8 is a logic flow diagram illustrating a method of estimating a roadway surface characteristic in accordance with the method of FIG. 5.

Referring now to FIG. 8, a logic flow diagram illustrating one particular method of ATMS sensor-based roadway surface condition estimation in accordance with an embodiment of the present invention is shown. This process is one example of the roadway surface condition estimation as called for in step 208 of FIG. 5. Of course, this example may be modified and applied to other embodiments of the present invention.

The routine starts at steps 216 and 218 by determining whether the vehicle is moving or braking. If the vehicle is moving, but not braking, the logic continues. Otherwise, no roadway surface condition is estimated in step 220.

The sensed tire data from steps 202, 204 and 206 as described above, is then compared to stored values from information block 210 in step 222. The stored Fourier response may comprise a lookup table of sensor signatures, each indicative of a roadway surface condition at various speeds. If the current frequency response characteristic matches any stored frequency response characteristic at the same vehicle speed indicative of a particular roadway surface condition in step 224, the logic continues to step 226. Otherwise, no roadway surface condition is estimated in step 220.

If a roadway surface condition match exists for the sensed ATMS data, step 226 begins the process of determining which roadway surface has been estimated. This continues through N stored roadway surface signatures, as shown in step 228. If the first tested roadway surface condition matches the sensed data, it is broadcast to the other vehicle subsystems in step 230, as described above. The confidence level of the roadway surface condition estimation can be determined from the closeness of the match and/or by confirmatory, calculations of wheel slip as discussed above. Further, if the system has a high confidence level regarding the declared roadway surface condition in step 232, and it is deemed useful driver information, it may be indicated to the vehicle operator, as in step 214. Again, for each of N stored roadway conditions, similar steps are indicated at 236, 238 and 240.

Figure 9:
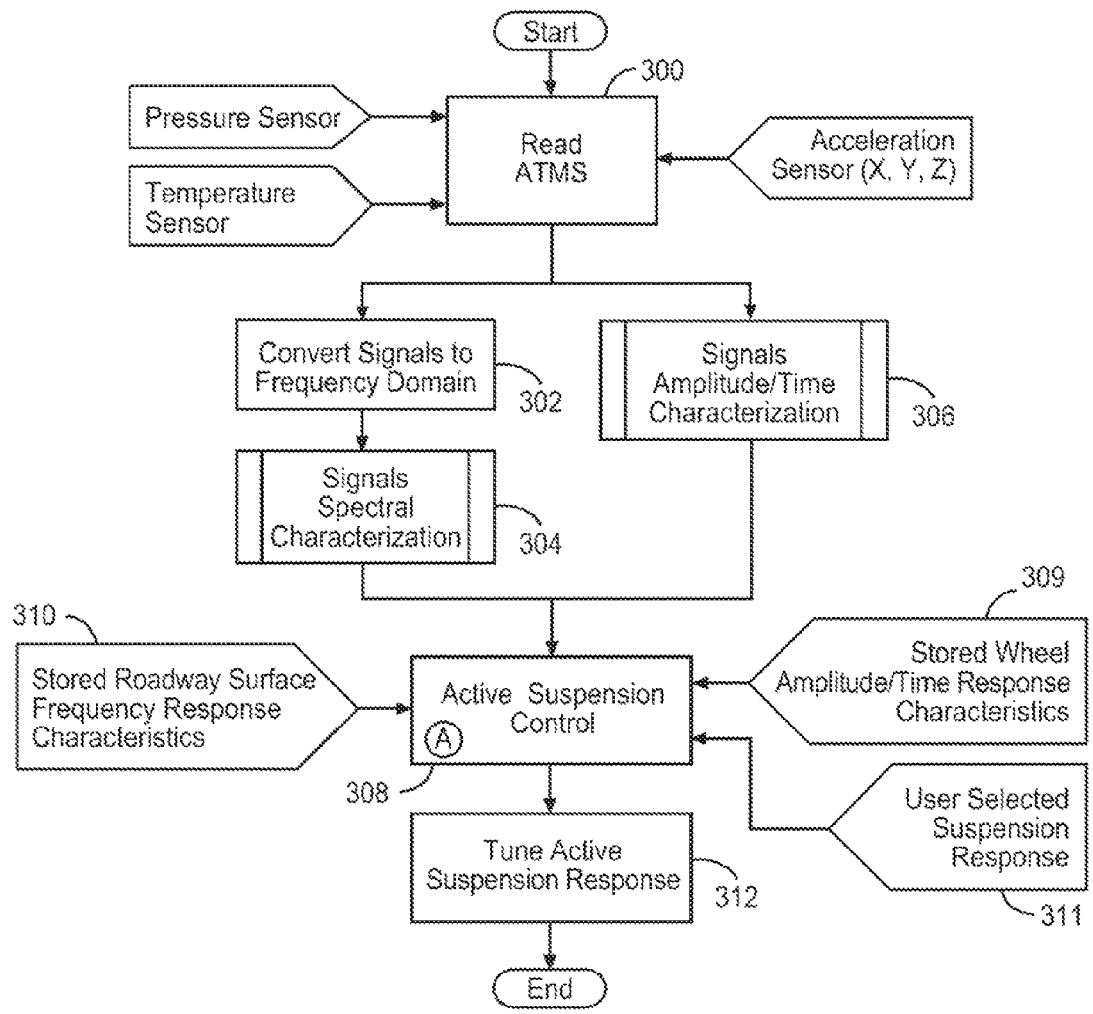
FIG. 9 is a logic diagram illustrating a method of operating a control system of a vehicle in accordance with an embodiment of the present invention providing active suspension control.

FIG. 9 is a logic flow diagram illustrating a method of operating a control system of a vehicle in accordance with an embodiment of the present invention providing active suspension control. Although the following steps are described primarily with respect to the embodiments of FIGS. 1-4, they may be modified and applied to other embodiments of the present invention, including vehicle embodiments wherein less than all sensors 35-47 are included. Indeed, in this example, only ATMS sensor 20 data at each wheel and the vehicle speed data are analyzed.

In general terms, the active suspension scheme detects the type of road surface being traversed by the vehicle, and actively adjusts the vehicle suspension to improve the ride comfort and/or vehicle handling. Roadway surfaces are differentiated by an analysis of the tire/wheel acceleration signals provided by the ATMS sensor 20 at each wheel, as described above. Rough road surfaces such as dirt roads exhibit higher acceleration signal and spectral content, i.e., acceleration frequency components, in the X and Z axis as compared to smooth road surfaces such as asphalt roads. On this basis, roadway surfaces can be detected, and suspension and/or tire adjustments can be made to improve vehicle ride and handling. Additionally, if the vehicle is equipped with operator-selectable handling, the desired vehicle handling can be incorporated into the active suspension scheme.

Adjustments to the suspension contemplated include modifying suspension dampers, ride height, and activating suspension bushings to modify suspension geometry and characteristics at the wheels. Active suspension dampers vary the amount of damping performance of the shock absorbers. They typically use megnetoreological fluids or pneumatic pressure to provide an extremely responsive change to damping performance. Most conventional suspension adjustment systems are "open loop" in that they rely upon operator input to adjust the suspension. In the example of the present invention, besides allowing open loop control, the system permits "closed loop" suspension control based on feedback from the ATMS 18. Ride height can be modified by an active air suspension system which uses compressed air to control suspension response and vehicle ride height. Again, convention systems are largely open loop systems that only sense vehicle height, whereas the present system permits closed loop control with respect to ride height and roadway surface conditions. Other active suspension components include sway bars that can be electronically decoupled by bushings to provide enhanced suspension articulation. Such features could also be used to automatically correct wheel misalignment, which could also be sensed by the ATMS 18.

Referring to FIG. 9, in step 300, ATMS signals are generated, which are indicative of the current tire pressure and temperature within and multi-axis accelerations at each wheel/tire of the vehicle. This information is provided by the ATMS sensors 20. Steps 302, 304 and 306 preprocess the data generated by the ATMS sensors 20. As mentioned above, because the data is generated inside each tire for the vehicle, the signature profiles of the sensor data provide direct insight into what each tire is experiencing while it contacts the road surface. This data is generated much more directly than vehicle acceleration data generated by conventional IMU sensing systems because traditional IMU systems determine roll, pitch and yaw and coordinate accelerations above the vehicle suspension. The ATMS sensors 20 eliminate signal propagation through the suspension, and provide a clearer "view" of the vehicle dynamics.

The preprocessed ATMS sensor data is then analyzed according to active suspension control criteria in step 308. A more detailed explanation of the active suspension control is provided in the example of FIG. 10. In this example, the sensor signals are compared to stored sensor frequency response signatures from block 310 and stored amplitude/time response signatures from block 309.

If the vehicle operator has selected a desired driving characteristic for the vehicle, by way of a user selectable input, this could also be provided from block 311. Such indicators may include "sport", "normal" or "comfort" handling and ride characteristics for the vehicle.

In step 312, the user-selected input 311 and active suspension control scheme 308 are used to actively tune the suspension to provide improved ride and handling. In one example, the vehicle is operated according to the user-selected ride setting, but actively adjusted based on the sensed road conditions. For instance, if the user selected a "sport" or "firm" ride characteristic, the perceived stiffness of the suspension would be softened upon detection of a rough road surface to alleviate any undesirable operator feedback or noise, vibration and Harshness.

The above-described steps are meant to be illustrative examples; the steps may be performed sequentially, synchronously, simultaneously, or in a different order depending upon the application.

Figure 10:
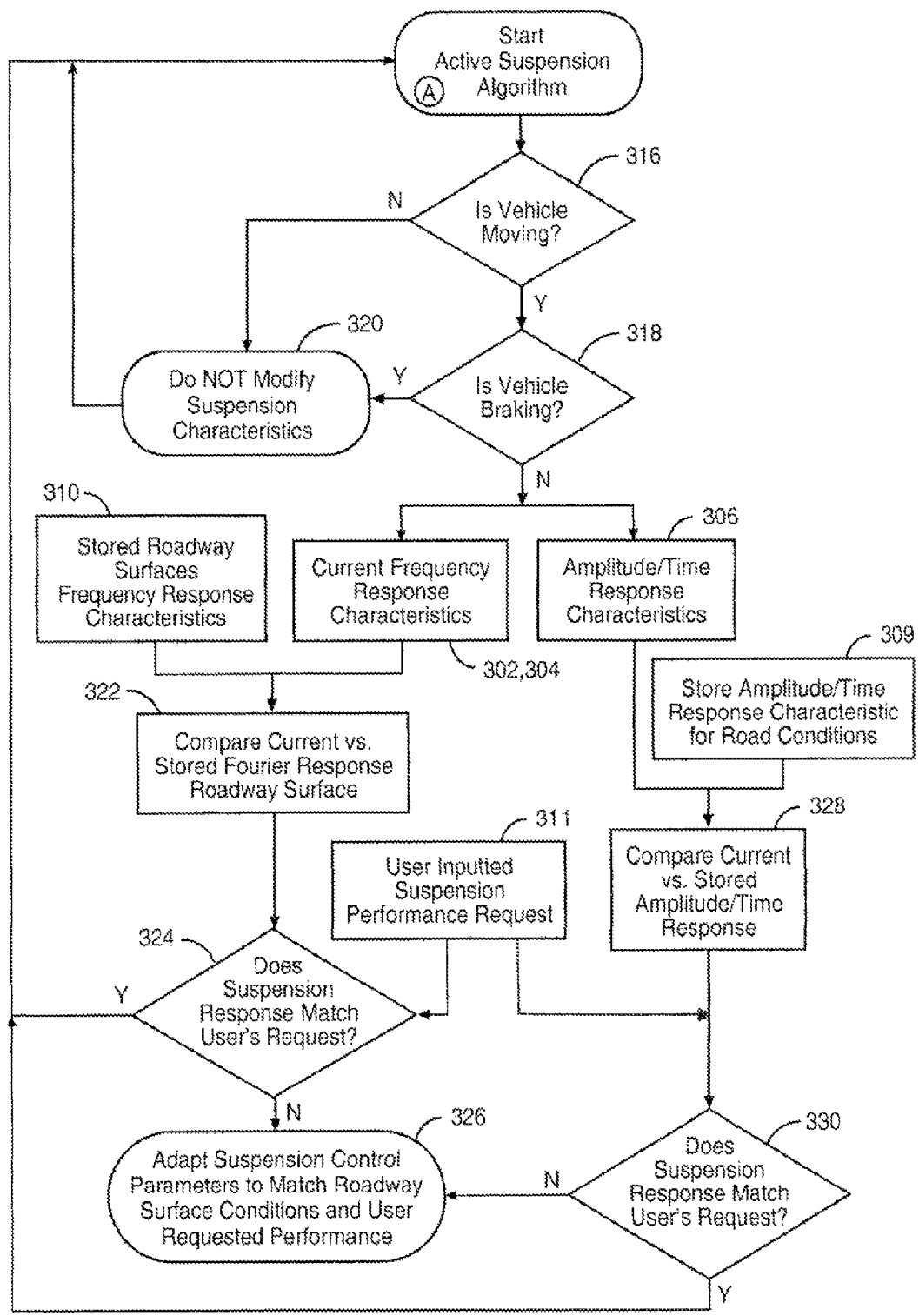
FIG. 10 is a logic flow diagram illustrating a method of active suspension control in accordance with the method of FIG. 9.

Referring now to FIG. 10, a logic flow diagram illustrating one particular method of ATMS sensor-based active suspension control in accordance with an embodiment of the present invention is shown. This process is one example of the active suspension control as called for in step 308 of FIG. 9. Of course, this example may be modified and applied to other embodiments of the present invention.

The routine starts at steps 316 and 318 by determining whether the vehicle is moving or braking. If the vehicle is moving, but not braking, the logic continues. Otherwise, no suspension characteristics are modified in step 320.

The sensed tire data from steps 302 and 304 as described above, is then compared to stored values at the same vehicle speed from information block 310 in step 322. The stored Fourier response may comprise a lookup table of sensor signatures, each indicative of a roadway surface condition. If the current frequency response characteristic is compatible with the operator-input suspension mode in step 324, no suspension adjustment is made. Otherwise, if the selected suspension mode is incompatible or undesirable for the detected road condition (i.e., "firm" ride on a rough road), the suspension is adjusted accordingly in step 326. The user-selected suspension mode is determined from block 311.

In step 328, the detected acceleration data, including the amplitude/time response characteristics of the ATMS data from block 306 is compared to stored amplitude/time response signatures at the same vehicle speed from block 309. The user-selected ride mode from block 311 is also considered in block 330. If the roadway surface condition-based suspension response matches the user-selected suspension mode, no changes are made. Otherwise, the suspension is adapted in step 326 as a function of the determined suspension setting according to the detected road surface conditions, taking into account the user-selected setting. As mentioned above, suspension adjustments can include modifying suspension dampers, ride height, and activating suspension bushings to modify suspension geometry and characteristics at the wheels. Further, any actions with regard to the suspension may be indicated to the vehicle operator, as before.

Thus, the suspension control system adjusts the vehicle suspension characteristics according to the user-selected suspension value when the user-selected value and the detected road surface conditions are the compatible; and adjusts the vehicle suspension characteristics according to the detected road surface condition when the user-selected suspension value and detected road surface conditions are incompatible, such as a sports ride selection under estimated rough road conditions.

In another aspect of active suspension control, rear wheel hop mitigation may be included. Rear wheel hop occurs when one or typically, both rear wheels vertically and laterally jump from uneven road surfaces. Such occurrences are common on dirt roads and as a result of tar strips in concrete. Rear wheel hop can cause sudden lateral (sideways) rear vehicle movement leading to temporary vehicle instability or compromised control.

Rear wheel hop mitigation may be implemented as part of the active suspension control. During a rear wheel hop event, the rear wheels experience both a Z (vertical) and Y (lateral) acceleration which can be readily detected by the ATMS 18. These signals will only be detected in the rear wheels with the exception of some Z axis acceleration component from the road surface. Thus, wheel signature profiles indicative of rear wheel hop can be stored as in blocks 309 and 310 and compared to the sensed wheel data from blocks 302, 304 and 306.

In response to a detected rear wheel hop event, step 326 can implement countermeasures to mitigate or prevent further wheel hop. Such countermeasures can include suspension adjustments, as mentioned above. Alternatively, or additionally, they may include reducing the engine power and/or braking the associated wheels.

While particular embodiments of the invention have been shown and described, numerous variations and alternate embodiments will occur to those skilled in the art. Accordingly, it is intended that the invention be limited only in terms of the appended claims.

What is claimed is:

1. A system for a vehicle comprising:
   a tire sensor located within each wheel of the vehicle and generating a tire signal comprising pressure, temperature and multi-axis acceleration data;
   at least one vehicle dynamics sensor providing a vehicle dynamics signal;
   a controller communicating with the tire sensor and the at least one vehicle dynamics signal, generating a brake signal in response to the vehicle dynamics signal and as a function of the multi-axis acceleration data of the tire signal; and
   a brake system applying a braking torque to each of the vehicle wheels in response to the brake signal generated by the controller.

2. A system according to claim 1 wherein the controller-generates the brake signal a function of the tire signal by comparing frequency and amplitude response characteristics of the rear tire signals to frequency and amplitude response characteristics of the front tire signals to determine a rear wheel hop event.

3. A system for a vehicle comprising:
   a tire sensor located within at least one wheel of the vehicle and generating a tire signal comprising pressure, temperature and multi-axis acceleration data;
   at least one vehicle dynamics sensor providing a vehicle dynamics signal;
   a controller communicating with the tire sensor and the at least one vehicle dynamics sensor and generating a brake signal in response to the vehicle dynamics signal and as a function of the multi-axis acceleration data of the front and rear tire signals; and
   a brake system applying a braking torque to at least one of the vehicle wheels in response to the brake signal generated by the controller.

4. A system according to claim 3 further comprising a tire sensor in at least one front wheel and a tire sensor in at least one rear wheel, the controller generates the brake signal as a function of the tire signals by comparing frequency and amplitude response characteristics of the at least one rear tire signal to frequency and amplitude response characteristics of the at least one front tire signal to determine a rear wheel hop event.

* * * * *